(12) United States Patent
Murakami

(10) Patent No.: US 6,250,765 B1
(45) Date of Patent: Jun. 26, 2001

(54) ANTIGLARE SHEET FOR USE WITH DISPLAY OF PORTABLE GAME MACHINE

(75) Inventor: Tetsuya Murakami, Tokyo (JP)

(73) Assignee: Abe Seisakusho Company, Limited, Saitama (JP)

(*) Notice: Subject to any disclaimer, the term of this patent is extended or adjusted under 35 U.S.C. 154(b) by 0 days.

(21) Appl. No.: 09/516,716

(22) Filed: Mar. 1, 2000

(30) Foreign Application Priority Data

Mar. 11, 1999 (JP) .................................................. 11-065637

(51) Int. Cl.$^7$ ............................. G02B 27/00; G02B 5/08
(52) U.S. Cl. ......................... 359/609; 359/601; 359/608
(58) Field of Search ................................... 359/601–615, 359/802–819, 455, 457; 348/832–842

(56) References Cited

U.S. PATENT DOCUMENTS

| | | | |
|---|---|---|---|
| 3,925,584 | * 12/1975 | Suzuki et al. | 428/40 |
| 4,788,597 | * 11/1988 | Gart et al. | 348/842 |
| 5,132,588 | * 7/1992 | Warman | 313/479 |
| 5,202,181 | * 4/1993 | Hara et al. | 428/350 |
| 5,549,267 | * 8/1996 | Armbruster et al. | 248/442.2 |
| 5,745,288 | * 4/1998 | Miyata et al. | 359/457 |

FOREIGN PATENT DOCUMENTS

| | | | |
|---|---|---|---|
| 3-198002 | * 8/1991 | (JP) | 359/609 |
| 530802 | 4/1993 | (JP) . | |
| 10232910 | 9/1998 | (JP) . | |

* cited by examiner

Primary Examiner—Thong Nguyen
(74) Attorney, Agent, or Firm—Jordan & Hamburg LLP

(57) ABSTRACT

An antiglare sheet ($\alpha$) for use with a display of a portable game machine includes a film element (1) serving as an antiglare film; an adhesive element (2) adapted to affix the film element (1) to a display screen; and a ventilation opening (4) adapted to ventilate a space (3) defined by the display screen and the film element (1).

8 Claims, 3 Drawing Sheets

Fig. 5

| No. | N1 | N2 | S1 | S2 | Ave.N | Ave.S | B1 | B2 | Ave.B |
|---|---|---|---|---|---|---|---|---|---|
| 1 | 29 | 25 | 28 | 21 | 5.4 | 4.9 | 11 | 11 | 11.0 |
| 2 | 25 | 15 | 38 | 30 | 4.0 | 6.8 | 24 | 19 | 21.5 |
| 3 | 21 | 21 | 9 | 27 | 4.2 | 3.6 | 21 | 26 | 23.5 |
| 4 | 11 | 13 | 18 | 17 | 2.4 | 3.5 | 27 | 23 | 25.0 |
| 5 | 18 | 16 | 29 | 22 | 3.4 | 5.1 | 11 | 8 | 9.5 |
| 6 | 11 | 14 | 20 | 21 | 2.5 | 4.1 | 20 | 22 | 21.0 |
| 7 | 19 | 16 | 24 | 25 | 3.5 | 4.9 | 23 | 27 | 25.0 |
| 8 | 26 | 28 | 25 | 29 | 5.4 | 5.4 | 14 | 25 | 19.5 |
| 9 | 37 | 26 | 39 | 20 | 6.3 | 5.9 | 18 | 14 | 16.0 |
| 10 | 28 | 32 | 61 | 66 | 6.0 | 12.7 | 18 | 17 | 17.5 |
| 11 | 11 | 11 | 32 | 39 | 2.2 | 7.1 | 23 | 28 | 25.5 |
| 12 | 20 | 26 | 42 | 29 | 4.6 | 7.1 | 25 | 19 | 22.0 |
| 13 | 42 | 42 | 86 | 80 | 8.4 | 16.6 | 41 | 44 | 42.5 |
| 14 | 15 | 14 | 33 | 53 | 2.9 | 8.6 | 12 | 14 | 13.0 |
| 15 | 27 | 25 | 62 | 51 | 5.2 | 11.3 | 26 | 22 | 24.0 |
| 16 | 12 | 19 | 28 | 29 | 3.1 | 5.7 | 16 | 14 | 15.0 |
| 17 | 14 | 12 | 32 | 27 | 2.6 | 5.9 | 15 | 12 | 13.5 |
| 18 | 57 | 32 | 72 | 49 | 8.9 | 12.1 | 15 | 16 | 15.5 |
| 19 | 34 | 28 | 68 | 46 | 6.2 | 11.4 | 11 | 16 | 13.5 |
| 20 | 54 | 21 | 62 | 34 | 7.5 | 9.6 | 22 | 15 | 18.5 |
| 21 | 66 | 37 | 76 | 97 | 10.3 | 17.3 | 24 | 28 | 26.0 |
| 22 | 22 | 16 | 37 | 25 | 3.8 | 6.2 | 14 | 12 | 13.0 |
| AVERAGE | | | | | 4.9 | 8.0 | | | 19.6 |

ANTIGLARE SHEET FOR USE WITH DISPLAY OF PORTABLE GAME MACHINE

BACKGROUND OF THE INVENTION

The present invention relates to an antiglare sheet for use with a display of a portable game machine adapted to lessen susceptibility of a user of the machine to visual dysfunction or ophthalmic anomaly, such as asthenopia, through affixment to the display.

Generally, when a worker is engaged in a visual work involving prolonged use of the eyes, he or she tends to suffer asthenopia.

Causes of asthenopia are classified into five categories: accommodative, myopathic, syndromic, aniseikonic, and neurogenic. However, a visual display terminal (VDT), such as a personal computer or TV has become a cause of asthenopia which does not definitively belong to any of these five categories.

Visual work with a VDT is said to involve visual dysfunction, such as fatigue of the eyes, visual disorder, dimming of vision, or eye pain; or ophthalmic anomaly, such as asthenopia, myopia, keratoconjunctivitis, increased tension of the eye, or lacrimal disorder. These symptoms are generically called VDT ophthalmopathy.

In order to prevent VDT ophthalmopatby, there has been devised a framed or film-type filter to be attached or affixed to a display screen of a desktop personal computer or to that of a TV. Such a filter shuts off a certain percentage of visible light emitted from a display and prevents reflection of external light in the display screen, to thereby improve contrast of a displayed image. When a display is of a cathode-ray-tube type, the filter removes radiation and ultraviolet rays emitted from the display.

However, such a filter for use with a display of a portable game machine has not been devised. Since the portable game machine is used both indoors and outdoors, the number of types of external light forming an image on the display screen increase. Examples of such external light include indoor lighting or sunlight. Further, since the portable game machine is often used while its display faces upward, the frequency at which external light forms an image on the display screen increases further.

Since a user plays a game with concentration while staring at the display screen of the portable game machine, reflection of an external-light source in the screen affects the eyes of, particularly, a preschooler or an elementary school student, who is in an important stage of physical development. Such an adverse effect on the eyes of children may cause an irreparable affection of their eyes. This is considered to be a kind of disease resulting from civilization, and has become a worldwide issue in relation to health of eyes.

The above problem may be solved through attachment of a frame-shaped filter to the display of a portable game machine or through bonding of a film-shaped filter to the display. However, attachment of a frame-shaped filter to the display impairs portability due to projection from the display. Further, in the case of a conventional film-shaped filter, since adhesive is applied to the entire surface of the filter, the filter is difficult to affix to the display screen through a manual operation. Also, the affixment involves entry of bubbles between the film and the screen, impairing visibility of the screen. Further, entrapped bubbles swell and expand with ambient temperature.

When an affixed film-type filter is removed from the display screen for replacement, the display screen is smeared with residual adhesive, impairing the function of a replacing filter. A similar problem arises when the same film-type filter is re-affixed; for example, after failure in an initial attempt at affixment.

In order to avoid the above problem, in manufacture of a display of a desktop apparatus, a film-type filter is mechanically affixed to the screen of the display for permanent affixment, thereby preventing entry of bubbles between the filter and the screen. However, when the filter is to be replaced due to deterioration, such as scratches, smudges of fingerprints, or discoloration caused by long-term use, the display itself must be sent to a repair shop. In the worst case, the display must be replaced.

SUMMARY OF THE INVENTION

The present invention has been accomplished in view of the above mentioned problems.

A first object of the present invention is to provide an antiglare sheet for use with a display of a portable game machine.

A second object of the present invention is to provide an antiglare sheet for use with a display of a portable game machine, capable of being easily replaced.

A third object of the present invention is to provide an antiglare sheet for use with a display of a portable game machine, which does not smudge the entire screen of the display during affixment or replacement thereof.

A fourth object of the present invention is to provide an antiglare sheet for use with a display of a portable game machine, being free of a functional change even at increased temperature, as is encountered during the summertime.

Other objects of the present invention will become apparent from the following description and the appended claims, taken in conjunction with the accompanying drawings.

To achieve the above objects, the present invention provides an antiglare sheet for use with a display of a portable game machine, comprising: a film element serving as an antiglare film; an adhesive element adapted to affix a circumferential portion of the back side of the film element to a portion of the display located within or outside the circumference of a display screen; and a ventilation opening adapted to ventilate a space defined by the display screen and the film element.

Specifically, the present invention provides an antiglare sheet for use with a display of a portable game machine, which antiglare sheet is adapted to irregularly reflect external light impinging on a display screen and comprises a film element adapted to irregularly reflect incident external light; and an adhesive element adapted to affix a circumferential portion of a back side of the film element to a portion of the display located within or outside the circumference of the display screen.

Preferably, the film element comprises a film base layer serving as a base of the film element; and an antiglare (AG) coat layer disposed on the film base and having a rough surface so as to irregularly reflect incident external light.

Preferably, the film element has a structure for attenuating light emitted from the display.

Preferably, the film element is completely transparent or is tinted so as to be transparent in a tinted manner.

Preferably, material for the film base layer is a transparent synthetic resin which contains polyethylene terephthalate (PET) resin, and material for the AG coat layer is a transparent synthetic resin which contains acrylic resin.

Preferably, the adhesive element comprises an adhesive base layer serving as a base of the adhesive element; an adhesion-to-film layer adapted to establish strong adhesion between the film element and one side of the adhesive base layer; and an adhesion-to-display layer adapted to establish weak adhesion between the display screen and the other side of the adhesive base layer.

Preferably, the adhesive element is transparent.

Preferably, material for the adhesive base layer is a synthetic resin which contains PET resin; material for the adhesion-to-film layer is a synthetic resin strong-adhesive which contains an acrylic strong-adhesive; and material for the adhesion-to-display layer is a synthetic resin weak-adhesive which contains an acrylic weak-adhesive.

Preferably, the adhesive element comprises a ventilation opening adapted to establish communication between the interior and exterior of a space defined by the display screen and the film element and assumes a discontinuous frame-shape.

By virtue of the above-described features, the antiglare sheet of the present invention prevents external light to form images on the display screen, to thereby bring about an increase in the blinking frequency of a user who plays a game on the portable game machine while staring at the display, thereby lessening susceptibility of the user to visual dysfunction or ophthalmic anomaly, such as asthenopia, which might otherwise result from VDT opbthalmopathy or dry eyes. Thus, the user feels comfortable while playing a game.

Further, the antiglare sheet of the present invention does not smudges the entirety of the display screen and can be easily replaced. Moreover, the antiglare sheet of the present invention can provide its function properly even when ambient temperature changes.

BRIEF DESCRIPTION OF THE DRAWINGS

While the specification concludes with claims particularly pointing out and distinctly claiming the subject matters of the present invention, it is believed the present invention will be better understood from the following description taken in connection with the accompanying drawings in which:

FIG. 5 is a table showing test data regarding the antiglare sheet of FIG. 1.

DETAILED DESCRIPTION OF THE INVENTION

Figure 1:
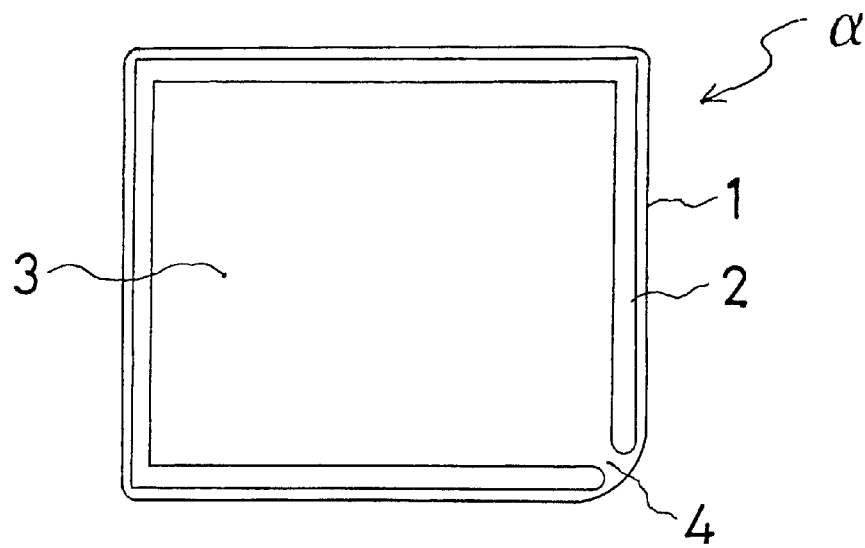
FIG. 1 is a bottom view showing an antiglare sheet for use with a display of a portable game machine according to an embodiment of the present invention, while a release sheet is removed therefrom.

An embodiment of the present invention will next be described in detail with reference to the drawings An antiglare sheet a for use with a display of a portable game machine according to the present embodiment includes a film element 1 serving as an antiglare sheet; an adhesive element 2 assuming a discontinuous frame-shape and adapted to affix the film element 1 to a display β1 of a portable game machine β; and a ventilation opening 4 located between the opposite ends of the adhesive element 2 and adapted to establish communication between an ambient atmosphere and the interior of a space 3 defined by the display β1 and the film element 1. The antiglare sheet a is shipped while a release sheet 5 is affixed to the adhesive element 2. The release sheet 5 assumes a shape and an area similar to those of the film element 1. When the antiglare sheet α is to be used, the release sheet 5 is removed from the antiglare sheet α, and then the antiglare sheet α is affixed to the display β1.

The antiglare sheet α is manufactured according to the size and shape of the display β1 of the portable game machine β.

Figure 2:
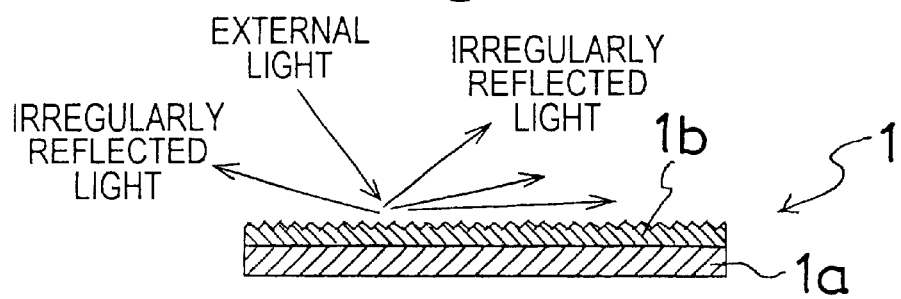
FIG. 2 is a sectional view showing a film element of the antiglare sheet of FIG. 1.

Referring to FIG. 2, the film element 1 includes a film base layer 1a and an antiglare (AG) coat layer 1b, which is formed on the film base layer 1a. The film base layer 1a has a thickness of, for example, about 50 $\mu$m to 188 $\mu$m. The AG coat layer 1b has a thickness of, for example, about 3 $\mu$m to 4 $\mu$m. The surface of the AG coat layer 1b is roughened so as to irregularly reflect incident external light, thereby preventing external light from forming an image.

Means for irregularly reflecting incident external light is not limited to the AG coat layer 1b. For example, the surface of the film base layer 1a may be roughened.

The film element 1 prevents external light, such as indoor lighting or sunlight, from forming an image on the display $\mu$1, thereby permitting a user to concentrate on a game while watching the display $\mu$1. The film element 1 is not necessarily completely transparent, but may be tinted so as to be transparent in a tinted manner.

Material for the film base layer 1a is polyethylene terephthalate (PET) resin, which is transparent, heat resistant, and tough. Material for the AG coat layer 1b is an acrylic resin. However, material for the film element 1 is not limited thereto.

In recent years, the display β1 of the portable game machine β employs liquid crystal, particularly color liquid crystal in many cases. Accordingly, in order to attain visibility even in the dark, the display β1 of a certain type is equipped with a backlight or sidelight. In such a case, light emitted from the display β1 may sometimes be too bright. In order to shut off a certain percentage of such excessively bright light, material for the film element 1 may be selected or treated as adequate.

Figure 3:
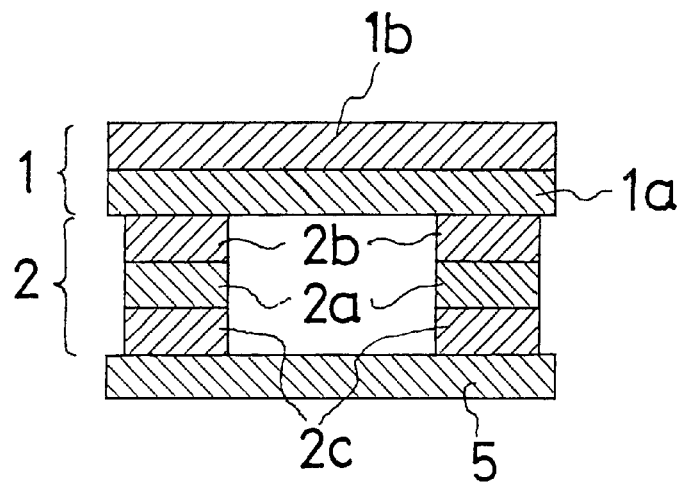
FIG. 3 is a schematic sectional view of the antiglare sheet of FIG. 1, while the release sheet is attached thereto.

Referring to FIG. 3, the adhesive element 2 includes an adhesive base layer 2a serving as a base thereof; an adhesion-to-film layer 2b adapted to affix one side of the adhesion base layer 2a to the film element 1; and an, adhesion-to-display layer 2c adapted to affix the other side of the adhesion base layer 2a to the display β1. The adhesion-to-film layer 2b assumes strong adhesion so as to prevent separation of the adhesive element 2 from the film element 1. By contrast, the adhesion-to-display layer 2c assumes weak adhesion so as to permit easy separation of the adhesive element 2 from the display β1.

Figure 4:
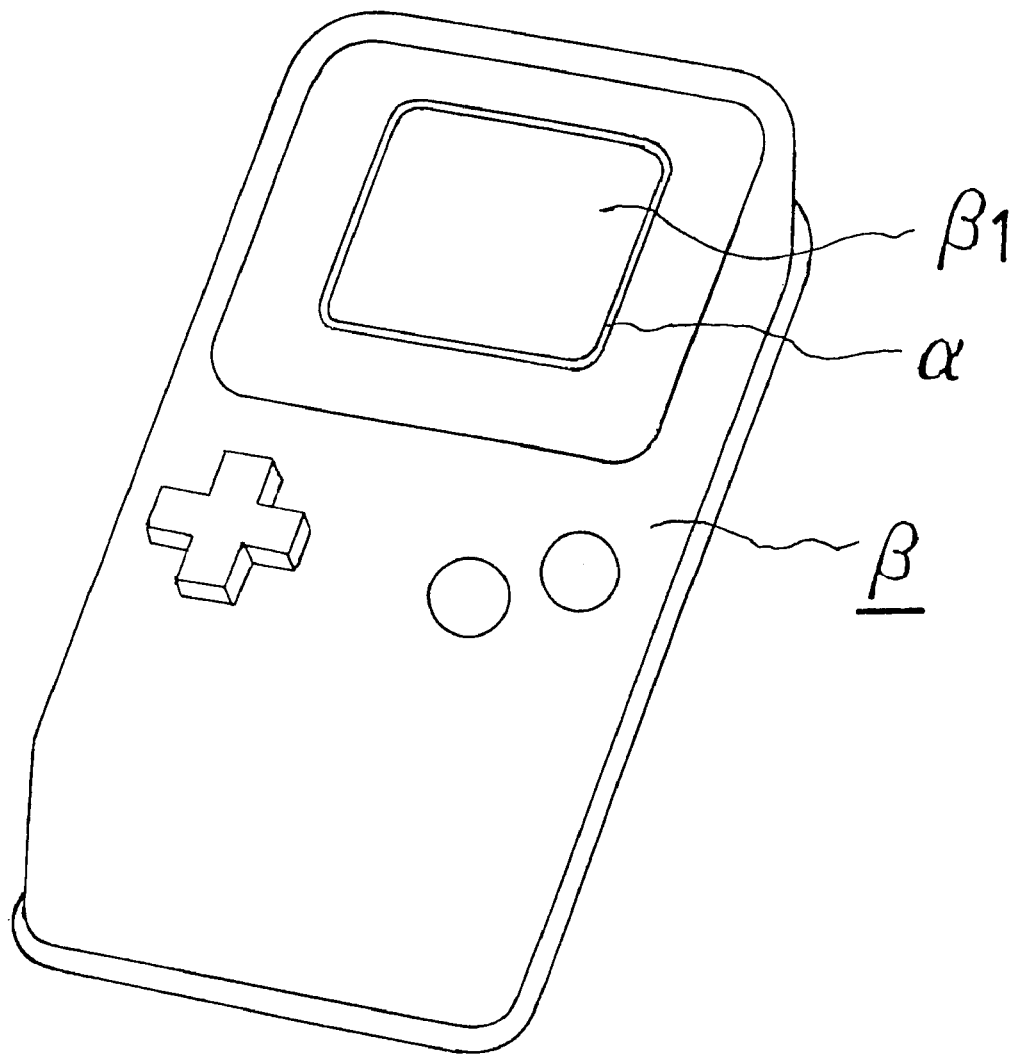
FIG. 4 is a schematic perspective view showing how the antiglare sheet of FIG. 1 is used.

Referring to FIG. 4, a circumferential portion of the back side of the film element 1 is affixed to a portion of the screen of the display β1 located within the circumference of the screen such that the adhesive element 2 is held between the display β1 and the film element 1. In this case, the adhesive element 2 is transparent so as not to interfere with the vision of a user who watches the display β1.

For example, transparent PET resin is used to form the adhesive base layer 2a having a thickness of 16 $\mu$m to 25 $\mu$m; a transparent acrylic strong-adhesive is used to form the adhesion-to-film layer 2b having a thickness of 20 $\mu$m to 30 $\mu$m; and a transparent acrylic weak-adhesive is used to form the adhesion-to-display layer 2c having a thickness of 20 $\mu$m to 30 μm. Material for the acrylic adhesives is, for example, acrylic ester copolymer, but is not limited thereto A circumferential portion of the back side of the film element 1 may be affixed to a portion of the display β1 located outside the screen. In this case, since the affixment does not interfere with the vision of a user, the adhesive element 2 does not need to be transparent.

The above-described antiglare sheet α of the present embodiment has, for example, the following optical and mechanical characteristics.

TABLE

| ITEM | MEASUREMENT |
| --- | --- |
| Haze (%) | 5.2 |
| Total transmittance (%) | 89.6 |
| 60-degree glossiness (%) | 65.8 |
| Initial adhesion | 100/100 |
| Steel wool hardness | No scratch |
| Pencil hardness | 2H |

Note: Steel wool of #0000 was used to test for steel wool hardness.

Antiglare sheets α of different haze values may be prepared in order to meet various kinds of requirements.

Even when the antiglare sheet α is removed from the display β1, the adhesive does not remain on the display β1 except for a portion of the display β1 in the vicinity of the circumference of the display screen. Also, when an existing antiglare sheet α is replaced with a new antiglare sheet α the new antiglare sheet α is affixed to the position where the old one was affixed. Thus, use of the antiglare sheet α does not involve a problem in which the entire screen of the display β is smudged with remaining adhesive as well as a problem in which bubbles held between the display β1 and the film element 1 interfere with visibility as might be observed in the case of adhesion of an antiglare sheet to the entire screen.

In the event that the film element 1 suffers deterioration, such as scratches, fingerprints, or discoloration, or that the adhesion of the adhesive element 2 is deteriorated, the deteriorated antiglare sheet α can be easily replaced with a new antiglare sheet α. Since the adhesive element 2 is affixed to a portion of the display β1 located within or outside the circumference of the display screen, the antiglare sheet α can be affixed or removed far more easily than in the case of affixment to the entire screen.

The space 3 having the thickness of the adhesive element 2 is formed between the display β1 and the film element 1. When ambient temperature rises as in the summertime, air contained in the space 3 expands, and excess air flows out from the space 3 through the ventilation opening 4. When ambient temperature drops, ambient air flows into the space 3 through the ventilation opening 4. The adhesive element 2 assumes a discontinuous frame-shape in order to form the ventilation opening 4.

Asthenopia results from not only VDT ophthalmopatby but also dry eyes. Dry eyes are an affection of the surface of the eye caused by reduced lacrimation or qualitatively abnormal tear fluid.

The causes of dry eyes include the following: physiological causes, such as advanced age, staying late at night, or high stress; reduced lacrimation or qualitative deterioration of tear fluid caused by illness or medication; accelerated evaporation of tear fluid caused by the large eyes or dry air; and use of contact lenses.

Tears function not only to prevent the eyes from drying but also to sterilize or clean the eyes or supply oxygen and nourishment to the eyes, thereby playing an important role in lessening susceptibility to visual dysfunction and ophthalmic anomaly, such as asthenopia.

Also, reduced blinking is an important cause of dry eyes. Elongated blinking intervals cause destruction of a tear layer. A minimum blinking interval which causes destruction of a tear layer is defined as tear-layer destruction time. Dry eyes will result unless the eyes are blinked before the elapse of the tear-layer destruction time.

While playing a game on the portable game machine β, a kind of VDT device, a user stares at the display β1, so that his/her blinking frequency reduces significantly. As a result, the user's eyes are highly likely to be damaged significantly due to VDT ophthalmopathy or dryness.

Since the size of the display β1 of the portable game machine β is small, a user tends to more stare at the display screen. Since the display β1 is not equipped with backlight or side light in most cases, the screen of the display β1 is generally dark, which accelerates the user's staring tendency. As a result, blinking frequency reduces accordingly.

According to the present embodiment, the film element 1 reflects incident external light irregularly to thereby prevent the external light from imaging. Thus, a user is less likely to stare at the display β1, so that his/her blinking frequency increases.

<TEST RESULTS>

The antiglare sheet a was tested for average blinking frequency while using a Game Boy from Nintendo as the portable game machine β and playing Tetris from Nintendo on the Game Boy. Tetris was selected as a game, since Tetris goes at random and is less susceptible to players' skill and arbitrariness. The test results are shown in FIG. 5.

22 Players participated in the test. Each player played the game twice while the antiglare sheet α was affixed to the display β1, and twice while the antiglare sheet α was not affixed to the display β1. Blinking frequency was counted during each player playing the game and in an ordinary state. In FIG. 5, N1 represents the number of blinks as counted when each player played the game first time while the antiglare sheet α was not affixed; and N2 represents that during the second play. S1 represents the number of blinks as counted when each player played the game first time while the antiglare sheet α was affixed; and S2 represents that during the second play. B1 represents the number of blinks as counted first time when each player was in the ordinary state; and B2 represents that as counted second time. Ave. N, Ave. S, and Ave. B represent the averages per minute of N1 and N2, S1 and S2, and B1 and B2, respectively. The averages of Ave. N values, Ave. S values, and Ave. B values, respectively, of all the players were also obtained.

The above N1, N2, S1, and S2 values were each obtained through counting for 5 minutes. The above B1 and B2 values were each obtained through counting for 1 minute. The above Ave. N values, Ave. S values, and Ave. B values were each an average count per minute.

Specifically, the test was conducted in the following manner. First, the number of blinks in the ordinary state was measured for 1 minute to obtain the B1 and B2 values. Each player was instructed to pick up either of two Game Boys which were placed while their displays faced down. The antiglare sheet α was affixed to the display of either of the two Game Boys. By use of the selected Game Boy, the player played the game for 5 minutes. After taking a 5-minute break, by use of the other Game Boy, the player played the game for 5 minutes. In this manner, the number of blinks—N1, N2, S1, and S2—was measured with respect to all the players.

As seen from FIG. 5, the average of Ave. N values of all the players in relation to the case where the antiglare sheet α was not used is 4.9 blinks/minute (maximum: 10.3; minimum: 2.2; standard deviation: 2.4), whereas the average of Ave. S values of all the players in relation to the case where the antiglare sheet α was used is 8.0 blinks/minute (maximum: 17.3; minimum: 3.5; standard deviation: 4.0). The average of Ave. B values of all the players in relation to the ordinary state is 19.6 blinks/minute (maximum: 42.5; minimum: 9.5; standard deviation: 7.2).

As revealed from the test results, the number of blinks as measured while the antiglare sheet α was employed is greater than that as measured while the antiglare sheet α was not employed, and is closer to that as measured in the ordinary state.

After the above test, the players favorably commented on employment of the antiglare sheet α, saying "the eyes are not fatigued," "free from irritation," "easy to follow the movement of the game," "less tired feeling after the game," and "the eyes are less likely to dry."

Thus, employment of the antiglare sheet α increases the number of blinks to thereby suppress worsening of VDT opbtbalmopathy and dry eyes, thereby lessening susceptibility to visual dysfunction and ophthalmic anomaly, such as asthenopia.

The present invention is not limited to the above-described embodiment. Numerous modifications and variations of the present invention are possible in light of the spirit of the present invention, and they are not excluded from the scope of the present invention.

What is claimed is:

1. An antiglare sheet for use with a display of a portable game machine, said antiglare sheet being adapted to irregularly reflect external light impinging on a display screen and comprising:

a film element adapted to irregularly reflect incident external light; and an adhesive adapted to affix a first circumferential portion of a back side of the film element to a second portion of the display located within or outside a circumference of the display screen while maintaining an interior space between a central portion of the back side of the film element which is generally circumscribed by said first circumferential portion and a central portion of said display screen which is generally circumscribed by said second circumferential portion; and a ventilation opening between said interior space and ambient air whereby said interior space is exposed to ambient air.

2. An antiglare sheet for use with a display of a portable game machine according to claim 1, wherein the film element comprises:

a film base layer serving as a base of the film element; and an antiglare coat layer disposed on the film base and having a rough surface so as to irregularly reflect incident external light.

3. An antiglare sheet for use with a display of a portable game machine according to claim 1 or 2, wherein the film element has a structure for attenuating light emitted from the display.

4. An antiglare sheet for use with a display of a portable game machine according to claim 1 or 2, wherein the film element is completely transparent or is tinted so as to be transparent in a tinted manner.

5. An antiglare sheet for use with a display of a portable game machine according to claim 2, wherein material for the film base layer is a transparent synthetic resin which contains polyethylene terephthalate resin, and material for the antiglare coat layer is a transparent synthetic resin which contains acrylic resin.

6. An antiglare sheet for use with a display of a portable game machine according to claim 1, 2 or 5, wherein the adhesive comprises:

an adhesive base layer serving as a base of the adhesive element;

an adhesion-to-film layer adapted to establish strong adhesion between the film element and one side of the adhesive base layer; and an adhesion-to-display layer adapted to establish weak adhesion between the display screen and another side of the adhesive base layer.

7. An antiglare sheet for use with a display of a portable game machine according to claim 1, 2 or 5, wherein the adhesive is transparent.

8. An antiglare sheet for use with a display of a portable game machine according to claim 6, wherein material for the adhesive base layer is a synthetic resin which contains polyethylene terephthalate resin;

material for the adhesion-to-film layer is a synthetic resin strong-adhesive which contains an acrylic strong-adhesive; and material for the adhesion-to-display layer is a synthetic resin weak-adhesive which contains an acrylic weak-adhesive.

* * * * *